United States Patent Office 3,544,619
Patented Dec. 1, 1970

3,544,619
PROCESS FOR PRODUCING CYCLOHEXYL-AMMONIUM N-CYCLOHEXYLSULFAMATE
Hachiro Yamaguchi, Hiroshima-shi, Japan, assignor to Nitto Chemical Industry Co., Ltd., Tokyo, Japan, a corporation of Japan
No Drawing. Filed Apr. 1, 1968, Ser. No. 717,983
Claims priority, application Japan, Apr. 19, 1967, 42/24,553
Int. Cl. C07c *161/00*
U.S. Cl. 260—501.12    4 Claims

ABSTRACT OF THE DISCLOSURE

The product of a reaction between cyclohexylamine and sulfur trioxide in a vapor phase at a temperature lower than 80° C. is heated in liquid cyclohexylamine at 90°–150° C., whereby the novel cyclohexylammonium N-cyclohexylimidodisulfonate contained in said reaction product is converted into cyclohexylammonium N-cyclohexylsulfamate, thereby increasing the yield of the desired product. Said cyclohexylammonium N-cyclohexylsulfamate can be converted into an alkali salt of cyclohexylsulfamic acid which is used as an artificial sweetener.

---

The present invention relates to a process for producing cyclohexylammonium N-cyclohexylsulfamate, which comprises effecting a direct vapor phase reaction between cyclohexylamine and sulfur trioxide at a low temperature and then heating the resulting reaction product in liquid cyclohexylamine.

Cyclohexylammonium N-cyclohexylsulfamate is a useful compound as an intermediate in the production of sodium cyclohexylsulfamate and calcium cyclohexylsulfamate which are widely used as artificial sweeteners stated in the official regulation of food additives, and it can be produced according to various processes. Among those processes, particular attention has recently been directed to a process which comprises N-sulfonating cyclohexylamine with sulfur trioxide as an advantageous process, because it employs inexpensive starting materials and a simple synthesizing apparatus, and enables continuous synthesis.

The formation of cyclohexylammonium N-cyclohexylsulfamate according to the above process is shown by the following reaction Formula 1:

$$2C_6H_{11}NH_2 + SO_3 \rightarrow C_6H_{11}NHSO_3H \cdot C_6H_{11}NH_2 \quad (1)$$

From said cyclohexylammonium N-cyclohexylsulfamate can be obtained a metal salt of cyclohexylsulfamic acid according to the following reaction Formula 2:

$$C_6H_{11}NHSO_3H \cdot C_6H_{11}NH_2 + NOH \rightarrow$$
$$C_6H_{11}NHSO_3M + C_6H_{11}NH_2 + H_2O \quad (2)$$

wherein M represents a basic metal ion. The present invention relates to an improvement in the reaction shown by the reaction Formula 1.

Said reaction is a vigorous exothermic reaction, and a special means is required to control the reaction. Even if the reaction should successfully be controlled, the reaction product would still generally contain impurities due to side-reactions, in addition to the main reaction product of the reaction Formula 1, and hence cyclohexylammonium N-cyclohexylsulfamate would be obtained in low yield.

It has heretofore been considered that the impurities due to side-reactions are N,N'-dicyclohexylsulfamide (hereinafter referred to as N,N'-sulfamide) and cyclohexylammonium sulfate which are formed according to the following reaction Formulas 3 and 3':

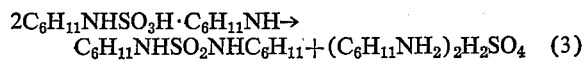
$$2C_6H_{11}NHSO_3H \cdot C_6H_{11}NH \rightarrow$$
$$C_6H_{11}NHSO_2NHC_6H_{11} + (C_6H_{11}NH_2)_2H_2SO_4 \quad (3)$$

$$C_6H_{11}NHSO_3H \cdot C_6H_{11}NH_2 + SO_3 \rightarrow$$
$$C_6H_{11}NHSO_2NHC_6H_{11} + H_2SO_4 \quad (3')$$

These by-products cannot be converted into an alkali salt of cyclohexylsulfamic acid even in the alkali-hydrolysis according to the reaction Formula 2, and this fact has been considered to be the main factor of lowering the yield of the main reaction product.

In order to inhibit said side-reactions and to increase the yield of the main reaction product, there has been a process which comprises reacting 10 moles or more of cyclohexylamine with one mole of sulfur trioxide at a relatively high temperature such as 70°–190° C. in a turbulent current zone (cf. U.S. Patent 3,226,430). However, since this reaction is a vigorous exothermic reaction, local heating is caused and consequently it is difficult to effect the reaction under appropriate reaction conditions. Besides, a complicated and expensive apparatus must be used in said process, even by which a satisfactory result is not always obtained owing to other side-reactions such as carbonization, coloration and the like.

The present inventor has done research on vapor phase reactions to cause the reaction of cyclohexylamine and sulfur trioxide to proceed under reaction conditions as mild as possible in order to overcome the above-mentioned disadvantages, and almost achieved the first desired object. He has further made a study on the reaction products an confirmed by a thin-layer chromatography that a large amount of a fourth unknown component is present in the reaction products, in addition to cyclohexylammonium N-cyclohexylsulfamate, N,N'-sulfamide and cyclohexylammonium sulfate which have heretofore been recognized to be present. Furthermore, they have discovered that said fourth component can readily be converted into cyclohexylammonium N-cyclohexylsulfamate through an aminolysis treatment which comprises heating said compound along with liquid cyclohexylamine at a temperature of 90°–150° C., whereby the yield is increased, and thus the present invention has been accomplished.

When the reaction product of cyclohexylamine and sulfur trioxide is subjected directly to an alkali-hydrolysis in a conventional manner without aminolysis treatment, a part of the fourth unknown component can be converted into the desired alkali salt of cyclohexylsulfamic acid. However, almost all thereof is converted into free cyclohexylamine and alkali sulfate, whereby undesirable phenomena, such as the reduction of the utilization efficiency of sulfur trioxide and alkali and the increase in the amount of cyclohexylamine recycled, are caused. Further, since the alkali-hydrolysis product of the fourth component contains nothing but the same as the alkali-treatment products of the well-known main and side-reaction products between cyclohexylamine and sulfur trioxide according to the reaction Formulas 3 and 3', the presence of the fourth component has been overlooked and thus the reduction of the yield due to unknown factor has been brought about without any suitable treatment to make better use of the fourth component.

The object of the present invention is to provide an industrially advantageous process for preventing the side-reactions, as far as possible, by effecting the reaction between cyclohexylamine and sufur trioxide, which is a vigorous exothermic reaction, in a vapor phase under mild, easily controllable conditions and further for increasing the utilization efficiency of the fourth component without isolating the fourth component from the reaction product.

Generally, the fourth unknown component is always present as by-product in the reaction product between cyclohexylamine and sulfur trioxide under suitable conditions. Said component can finally be converted into cyclohexylammonium N-cyclohexylsulfamate, which is the desired product, through an aminolysis treatment which comprises heating the fourth component in liquid cyclohexylamine at a temperature of 90°–150° C. Further, the cyclohexylammonium N-cyclohexylsulfamate produced in the first-step reaction is not affected at all by the aminolysis treatment. Thus, the cyclohexylammonium N-cyclohexylsulfamate content in the final reaction product can be increased by subjecting the reaction product in the first-step to the aminolysis treatment as it is.

Since the reaction between cyclohexylamine and sulfur trioxide, which is the first-step reaction in the present invention and is the reaction for providing the compound to be subjected to the aminolysis treatment according to the present invention, is originally a vigorous exothermic reaction, it should be effected under conditions as mild as possible. Therefore, the vapor of cyclohexylamine and sulfur trioxide diluted with a suitable amount of an inert gas are subjected to direct vapor phase reaction. As the diluent gas for sulfur trioxide, there may be used dry air, nitrogen, sulfur dioxide and other inert gases. When the concentration of sulfur trioxide is 60% or less, the control of the reaction is particularly easy. The transformed gas in the catalytic sulfuric acid production is equivalent to sulfur trioxide diluted with dry air in a concentration of 5–15%, and therefore, it may be used as such in the present invention.

The reaction proceeds very rapidly to form a white powdery product. The reaction temperature is preferably 80° C. or less. When the reaction product obtained at a temperature higher than 80° C. is subjected to the aminolysis treatment, the yield can slightly be increased, but more disadvantages due to reaction at high temperatures are rather encountered, such as the difficulty in maintaining the reaction system at a constant temperature while eliminating a large amount of reaction heat to inhibit local heating, and the coloration of the product. Therefore, the use of such higher temperatures is not advantageous.

The boiling point of cyclohexylamine is about 135° C., and its vapor pressure is relatively high. Therefore the vaporization thereof is easy. The molar ratio between cyclohexylamine and sulfur trioxide may be varied depending upon the reaction process, though cyclohexylamine is preferably used in slight excess, for example, 1.5–4.0 moles of cyclohexylamine per mole of sulfur trioxide is suitable. It is necessary that the starting materials, cyclohexylamine and sulfur trioxide, including diluent gas, are completely dry, and the presence of water results in the formation of sulfuric acid and the by-product, cyclohexylammonium sulfate, whereby the yield is lowered.

In the present invention, the reaction conditions are not limited to such conditions as to produce cyclohexylammonium N-cyclohexylsulfamate in a high yield only by the sulfonation in the first step, and it is only required that the total amount of cyclohexylammonium N-cyclohexylsulfamate and the fourth component produced is large, in order to obtain finally cyclohexylammonium N-cyclohexylsulfamate in a high yield. Therefore, the reaction may be effected under such conditions, followed by the aminolysis treatment.

By effecting the first-step reaction under the vapor phase reaction conditions as mentioned above the amount of N,N'-sulfamide and sulfates produced as by-products is necessarily lowered, and thus, the yield and the purity of the final product are increased so much. Further, according to the present invention, the end product can be obtained in high yield from the sulfonation reaction product which is obtained through a simple operation with a simple apparatus under mild conditions without using severe conditions, a special apparatus, and a special operational method required to attain the maximum yield through the sulfonation reaction alone. Therefore, the present invention has a great value from an industrial point of view.

The amount of cyclohexylamine used in the aminolysis treatment of the second-step reaction, which comprises heating therewith the sulfonation reaction product in the first step, may be practically less than several fractions of the weight of the sulfonation reaction product (theoretically it is calculated based upon the reaction Formula 6 mentioned hereinafter), though, from the viewpoint of operation, the treatment can be more readily carried out when cyclohexylamine is used in an amount 2–10 times the weight of the sulfonation product, since sulfonation product is solid. Since the reaction between cyclohexylamine and sulfur trioxide is usually effected in the presence of an excess of cyclohexylamine, the reaction mixture in this case may be heated to 90°–150° C. without isolating the reaction product from the excess cyclohexylamine.

The heating temperature is only required to be above 90° C. The higher the heating temperature, the shorter the period required for the aminolysis becomes. In view of the fact that the boiling point of cyclohexylamine is about 135° C., great industrial advantages can be attained by heating the reaction mixture at said temperature (135° C.) under the reflux of cyclohexylamine; for example, the heat-treatment at a fixed temperature can be simply and readily carried out, apparatus for atmospheric pressure may be used, and the aminolysis treatment can be completed within 30 minutes. When it is needed to conduct the aminolysis treatment more rapidly, the heating may be effected at a temperature higher than said boiling point, though the treatment must be carried out under pressure. On an industrial scale, it is preferable to effect the reaction at a temperature near the boiling point, more preferably at 150° C. or lower. The heating above 190° C. results in the decomposition of cyclohexylammonium N-cyclohexylsulfamate.

The fourth unknown component is a novel compound having a chemical structure supposed to be the same as that of cyclohexylammonium N-cyclohexylimidodisulfonate. This compound can be formed according to the reaction Formula 4, and, by a conventional hydrolysis, can be converted into a cyclohexylsulfamate and a sulfate, as shown in the reaction Formula 5 or 5'. Accordingly, the results in the prior art, such as the reduction of yield of the desired product and the formation of a sulfate as a by-product in a large quantity, can be clearly understood.

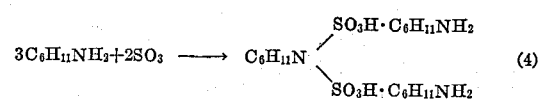

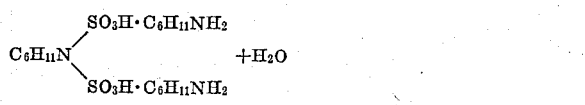

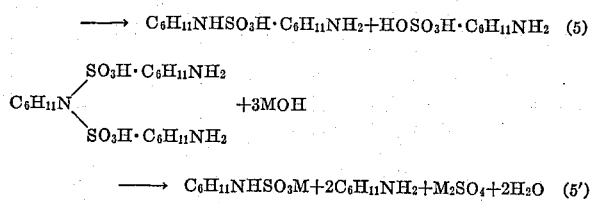

However, when the aminolysis treatment is carried out, said novel compound is converted only into the main desired product, i.e. cyclohexylammonium N-cyclohexylsulfamate, as shown in the reaction Formula 6, and no sulfate can be formed. Thus, the yield of the end product can be remarkably increased.

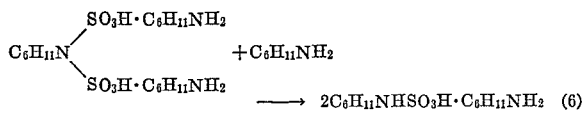

$$\longrightarrow 2C_6H_{11}NHSO_3H \cdot C_6H_{11}NH_2 \quad (6)$$

According to the present invention, an alkali salt of N-cyclohexylsulfamic acid can be obtained in high yield through the amine decomposition followed by alkali-hydrolysis. On the other hand, the final amount of the by-products, such as cyclohexylammonium sulfate and N,N'-sulfamide is not more than the slight amount of the by-products formed in the first-step reaction.

The present invention is further illustrated by the following examples.

EXAMPLE 1

500 parts of cyclohexylamine is charged into a reactor provided with a stirrer. The reactor is heated in a hot water bath at 40° C. and sulfur trioxide diluted with a nitrogen gas (the concentration of $SO_3$ is 4% by weight) is introduced for 3 hours into the cyclohexylamine vapor generated at 40° C. under stirring, to effect the reaction therebetween. At this time, the temperature of the gaseous phase in the reactor is 34°–36° C.

The major part of the powdery product is passed together with the nitrogen stream into a collector, connected to the reactor, and collected therein. On the other hand, a part thereof is absorbed into the amine solution in the reactor and another part which has passed through the collector in the form of a finely divided particle is passed through cyclohexylamine with the waste gas to absorb it into the amine.

The powdery reaction product and the reaction product in the amine are collected with the amine, and they are heated at 120° C. with stirring for 90 minutes, i.e. subjected to the aminolysis treatment, and the excess cyclohexylamine is then distilled off under reduced pressure. The composition of the product found by analysis is as follows:

| Composition | Percent | |
|---|---|---|
| | Example | Control |
| Cyclohexylammonium N-cyclohexylsulfamate | 82.3 | 65.4 |
| Cyclohexylammonium sulfate | 10.7 | 29.9 |
| N,N'-sulfamide | 5.6 | 4.7 |

The control refers to the results obtained by hydrolysis alone without the amine decomposition treatment. The comparison of the example with the control shows an about 17% increase in the yield of cyclohexylammonium N-cyclohexylsulfamate.

EXAMPLE 2

In the same manner as in Example 1, sulfur trioxide diluted with air (the concentration of $SO_3$ is 7.2% by weight) is introduced into the vapor of cyclohexylamine generated from liquid cyclohexylamine heated in a hot water bath at 60° C. to effect the reaction therebetween. At this time, the temperature of the gaseous phase in the reactor is 60°–62° C. The resulting reaction product is subjected to the aminolysis treatment by heating the product with an excess of cyclohexylamine at about 135° C. under reflux for 30 minutes. The excess cyclohexylamine is distilled off under reduced pressure. The composition of the product found by analysis is as follows:

| Composition | Percent | |
|---|---|---|
| | Example | Control |
| Cyclohexylammonium N-cyclohexylsulfamate | 90.0 | 61.9 |
| Cyclohexylammonium sulfate | 6.6 | 36.7 |
| N,N'-sulfamide | 2.1 | 1.4 |

In this case, the proportion of cyclohexylammonium N-cyclohexylsulfamate reaches 90% and the comparison thereof with the control shows that the increase in yield is approximately 30%.

I claim:

1. A process for producing cyclohexylammonium N-cyclohexylsulfamate which comprises introducing sulfur trioxide diluted with an inert gas into a cyclohexylamine vapor to effect a direct vapor phase reaction at a temperature not higher than 80° C., and then heating the resulting reaction product at 90°–150° C. in liquid cyclohexylamine.

2. A process according to claim 1, wherein 1.5–4.0 moles of cyclohexylamine is reacted with 1 mole of sulfur trioxide.

3. A process according to claim 1, wherein said reaction product is heated at 90°–150° C. in cyclohexylamine in an amount 2–10 times the weight of the reaction product.

4. A process according to claim 1, wherein the sulfur trioxide is diluted with air, nitrogen or other inert gas.

References Cited

UNITED STATES PATENTS

| 3,226,430 | 12/1965 | Mhatre | 260—513.6 |
| 3,401,195 | 9/1968 | Crampton et al. | 260—513.6 |
| 3,090,806 | 5/1963 | Yamaguchi et al. | 260—513.6 |

DANIEL D. HORWITZ, Primary Examiner

U.S. Cl. X.R.

260—513.6